(12) United States Patent
Sakata et al.

(10) Patent No.: US 10,974,766 B2
(45) Date of Patent: Apr. 13, 2021

(54) SIDE SILL STRUCTURE AND METHOD FOR MANUFACTURING SIDE SILL STRUCTURE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Yasuhiro Sakata, Kariya (JP); Takeshi Hiratsuka, Kariya (JP); Koichi Enoki, Toyota (JP); Kosei Ota, Okazaki (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 16/289,763

(22) Filed: Mar. 1, 2019

(65) Prior Publication Data

US 2019/0276084 A1 Sep. 12, 2019

(30) Foreign Application Priority Data

Mar. 6, 2018 (JP) .............................. JP2018-039675

(51) Int. Cl.
*B62D 21/15* (2006.01)
*B62D 25/20* (2006.01)

(52) U.S. Cl.
CPC ....... *B62D 21/155* (2013.01); *B62D 25/2036* (2013.01)

(58) Field of Classification Search
CPC .......................... B62D 21/155; B62D 25/2036
See application file for complete search history.

(56) References Cited

U.S. PATENT DOCUMENTS

| 6,053,564 | A | * | 4/2000 | Kamata | B62D 21/152 |
| | | | | | 296/187.09 |
| 6,322,134 | B1 | * | 11/2001 | Yang | B62D 25/04 |
| | | | | | 296/187.09 |
| 9,902,428 | B2 | * | 2/2018 | Murata | B62D 21/155 |
| 10,322,753 | B2 | * | 6/2019 | Watanabe | B62D 21/15 |
| 10,604,189 | B2 | * | 3/2020 | Sekiya | B62D 27/00 |
| 2012/0248825 | A1 | | 10/2012 | Tamura | |
| 2013/0020836 | A1 | | 1/2013 | Shida et al. | |
| 2015/0344071 | A1 | * | 12/2015 | Nakano | B62D 25/04 |
| | | | | | 296/187.09 |
| 2016/0052552 | A1 | | 2/2016 | Yamamoto | |

FOREIGN PATENT DOCUMENTS

| JP | 11-342869 | A | 12/1999 |
| JP | 2000-203462 | A | 7/2000 |
| JP | 2000-255451 | A | 9/2000 |
| JP | 2011-207455 | A | 10/2011 |
| JP | 2014-083972 | A | 5/2014 |
| WO | 2011/077808 | A1 | 6/2011 |
| WO | 2014/155539 | A1 | 10/2014 |

* cited by examiner

*Primary Examiner* — Faye M Fleming
(74) *Attorney, Agent, or Firm* — Sughrue Mion, PLLC

(57) ABSTRACT

A side sill outer panel and a side sill inner panel form a closed cross-sectional structure. A front end of a side sill is located at a rear of and spaced apart from a front tire-wheel unit on a front side of a vehicle. The side sill extends rearward. A front end portion of an outer reinforcement is located rearward from front end portions of both the side sill outer panel and the side sill inner panel.

2 Claims, 4 Drawing Sheets

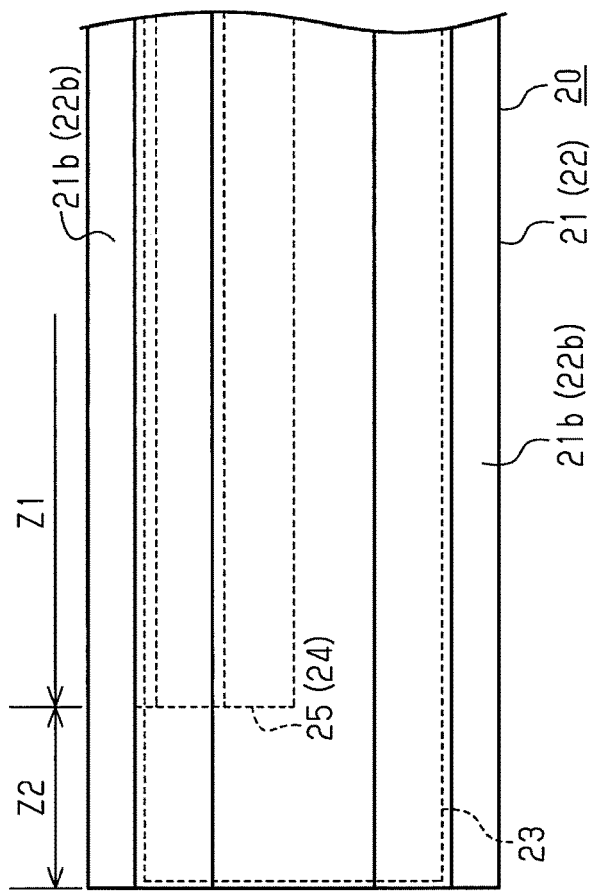
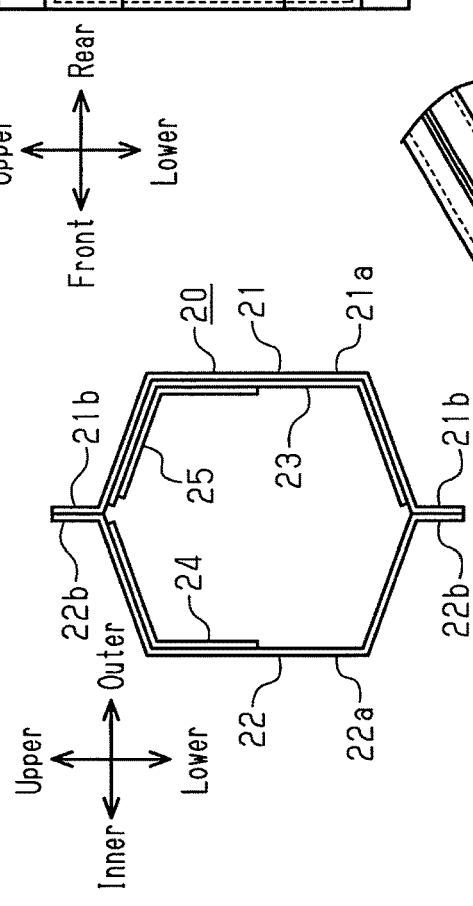
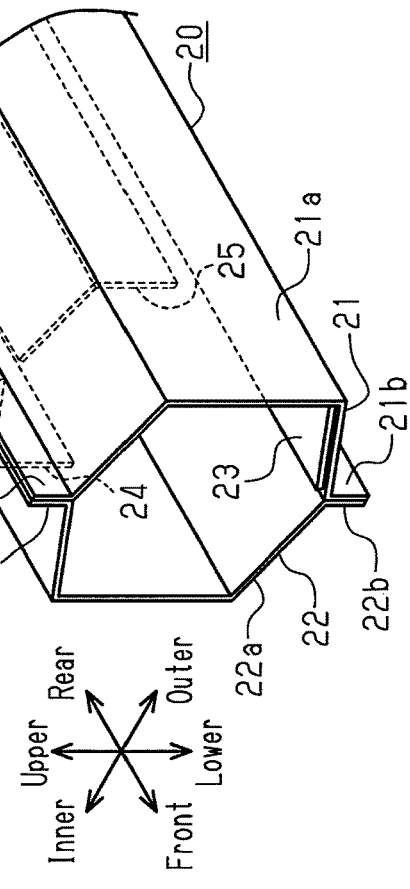

SIDE SILL STRUCTURE AND METHOD FOR MANUFACTURING SIDE SILL STRUCTURE

BACKGROUND

1. Field

The following description relates to a side sill structure of a vehicle and a method for manufacturing a side sill structure of a vehicle.

2. Description of Related Art

Japanese Laid-Open Patent Publication No. 2014-83972 describes an example vehicle side structure including a rocker inner reinforcement that serves as the reinforcement structure of a side sill. The front end of the rocker inner reinforcement in the front-to-rear direction of a vehicle and the upper end of the rocker inner reinforcement in the vertical direction of the vehicle serve as weak portions. The weak portions overlap with brake calipers in the width and vertical directions of the vehicle. This reduces the amount of deformation of the rocker even when a small overlap crash causes the rocker inner reinforcements and the brake calipers to interfere with each other through the front tire-wheel unit.

Typically, the front end of the side sill is located at the rear of and spaced apart from the front tire-wheel unit. The side sill extends rearward.

When a small overlap crash causes the outer side of the wheel of the front tire-wheel unit to strike the outer side of the side sill, the load applied from the wheel needs to be absorbed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an object of the present disclosure to provide a side sill structure of a vehicle that absorbs the load applied from the outside of a wheel when a small overlap crash occurs and a method for manufacturing the side sill structure.

Example 1

A side sill structure including a side sill is provided. The side sill includes a side sill outer panel and a side sill inner panel. The side sill outer panel and the side sill inner panel form a closed cross-sectional structure. The side sill also includes an outer reinforcement. A front end of the side sill is located at a rear of and spaced apart from a front tire-wheel unit on a front side of a vehicle. The side sill extends rearward. A front end portion of the outer reinforcement is located rearward from front end portions of both the side sill outer panel and the side sill inner panel.

In the above-described structure, the front end portion of the side sill outer shoulder reinforcement is located rearward from the front end portions of both the side sill outer panel and the side sill inner panel. Thus, when the outer side of the wheel of the front tire-wheel unit strikes the outer side of the side sill during a small overlap crash, the portion that does not include the outer reinforcement acts as the crush area to absorb the load applied from the outer side of the wheel.

Example 2

In the side sill structure according to example 1, the front pillar may include a rear wall connected to the side sill, and the front end portion of the outer reinforcement may be located frontward from a position where the rear wall of the front pillar is connected to the side sill.

Example 3

A method for manufacturing a side sill structure including a side sill structure corresponding to the above-described examples 1 and 2 may be provided. A method for manufacturing a side sill structure including a side sill, the method comprising: forming a closed cross-sectional structure with a side sill outer panel and a side sill inner panel; arranging a front end of the side sill at a rear of a front tire-wheel unit on a front side of a vehicle and spacing the front end of the side sill apart from the front tire-wheel unit; extending the side sill rearward; reinforcing the side sill with an outer reinforcement; and arranging a front end portion of the outer reinforcement rearward from front end portions of both the side sill outer panel and the side sill inner panel.

According to the above examples, the present disclosure allows for absorption of the load applied from the outside of a wheel when a small overlap crash occurs.

Other features and aspects will be apparent from the following detailed description, the drawings, and the claims.

BRIEF DESCRIPTION OF THE DRAWINGS

FIG. 5A is a front view showing the side sill of FIG. 1.

FIG. 5B is a side view showing the side sill of FIG. 1.

FIG. 5C is a perspective view showing the side sill of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
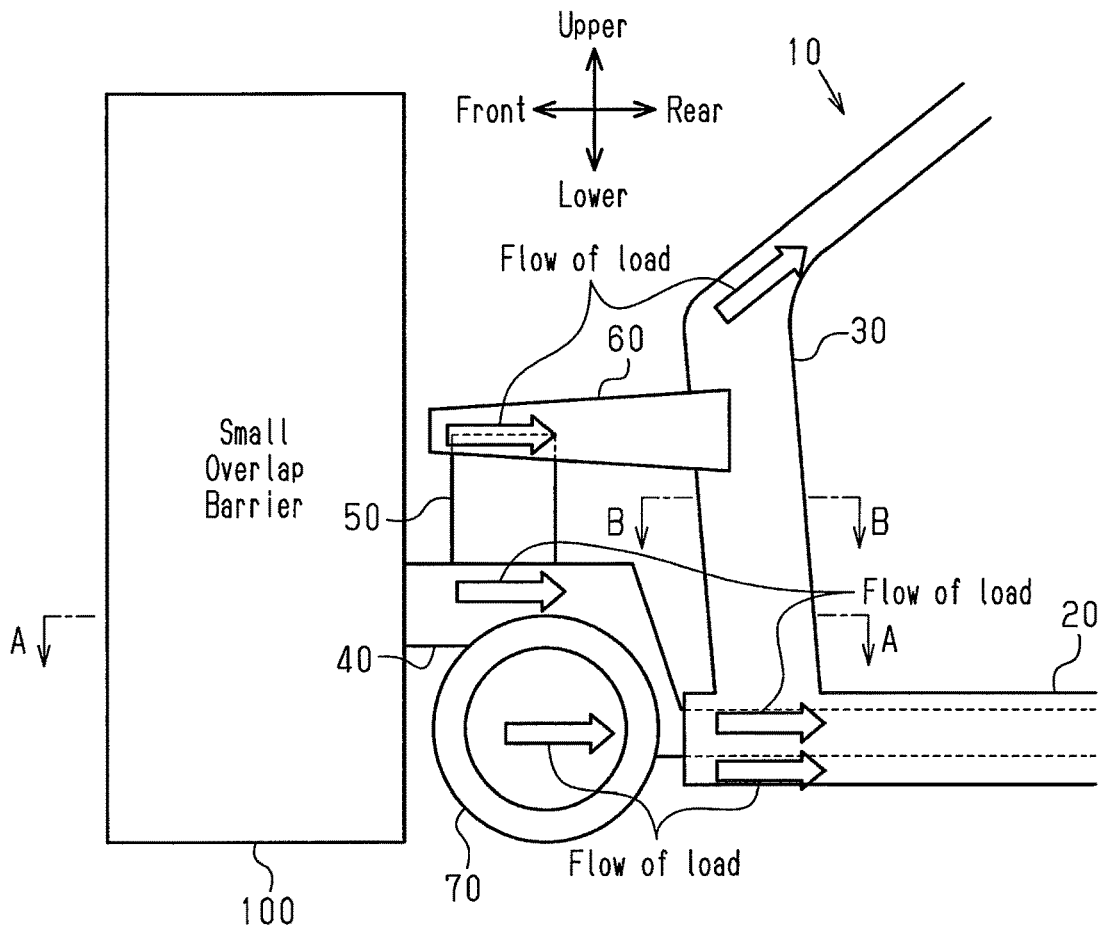
FIG. 1 is a side view showing the front framework of a vehicle according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An embodiment according to the present disclosure will now be described with reference to FIGS. 1 to 7.

In the drawings, the "front," "rear," "upper," and "lower" respectively refer to the front-rear direction and the vertical direction of a vehicle, and the "inner" and "outer" respectively refer to the inner side and the outer side of the vehicle (passenger compartment).

Figure 2:
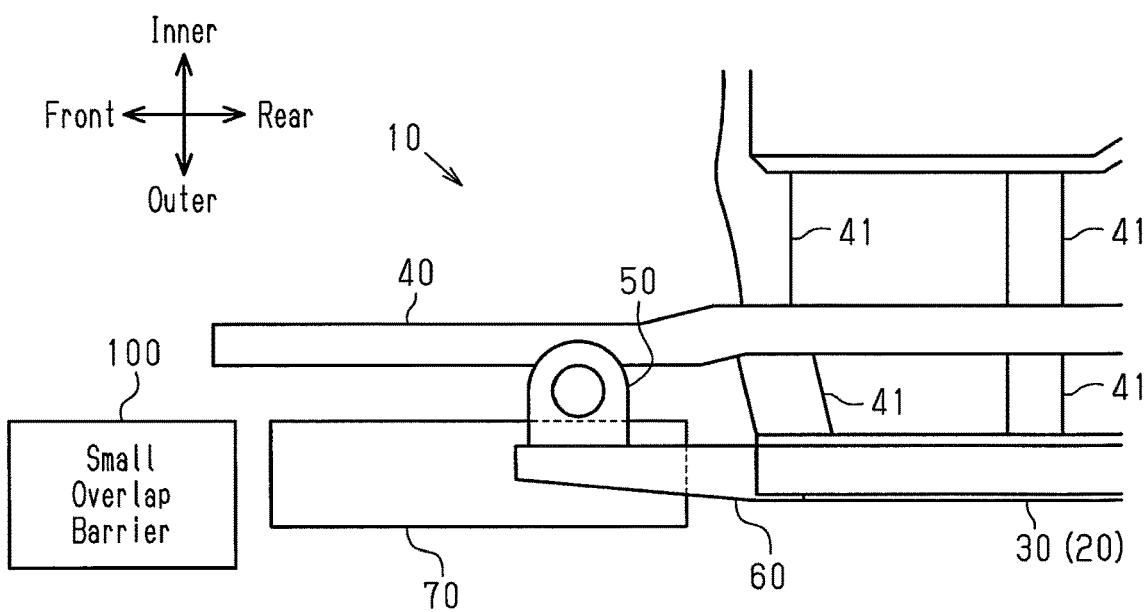
FIG. 2 is a plan view showing the front framework of the vehicle of FIG. 1.

As shown in FIGS. 1 and 2, the vehicle includes a front framework 10. The front framework 10 includes a side sill 20 located at the rear of a front tire-wheel unit 70, a front pillar 30, a front side member 40, a suspension tower 50, and a cowl top side 60.

Figure 6:
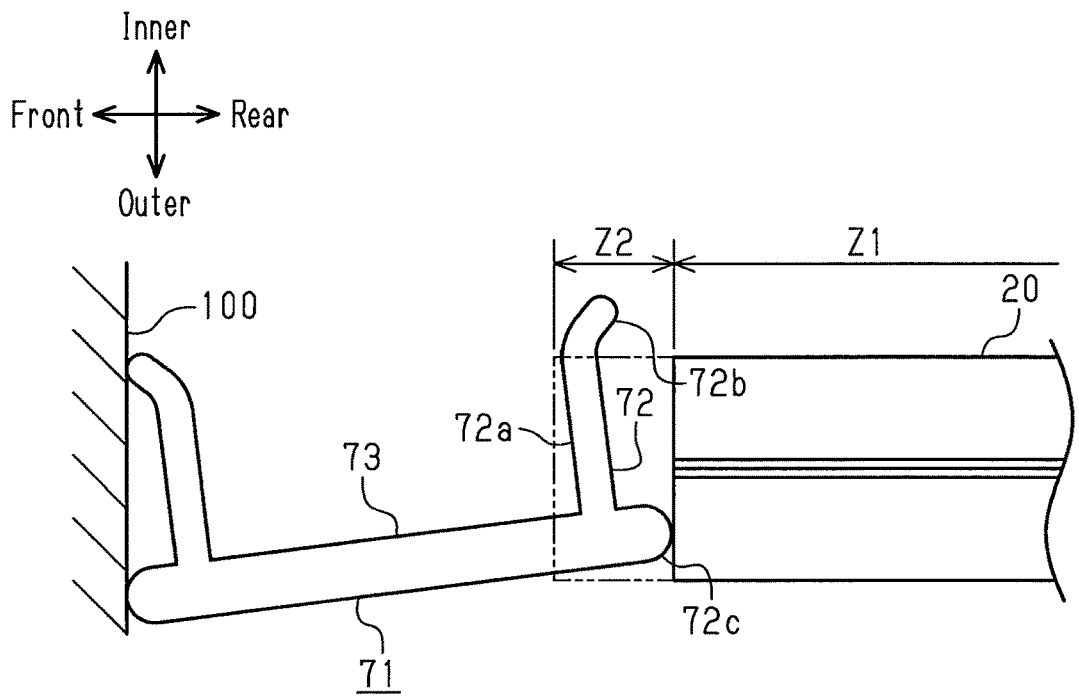
FIG. 6 is a diagram illustrating a state of the side sill when a small overlap crash occurs at a portion corresponding to line A-A in FIG. 1.
Figure 7:
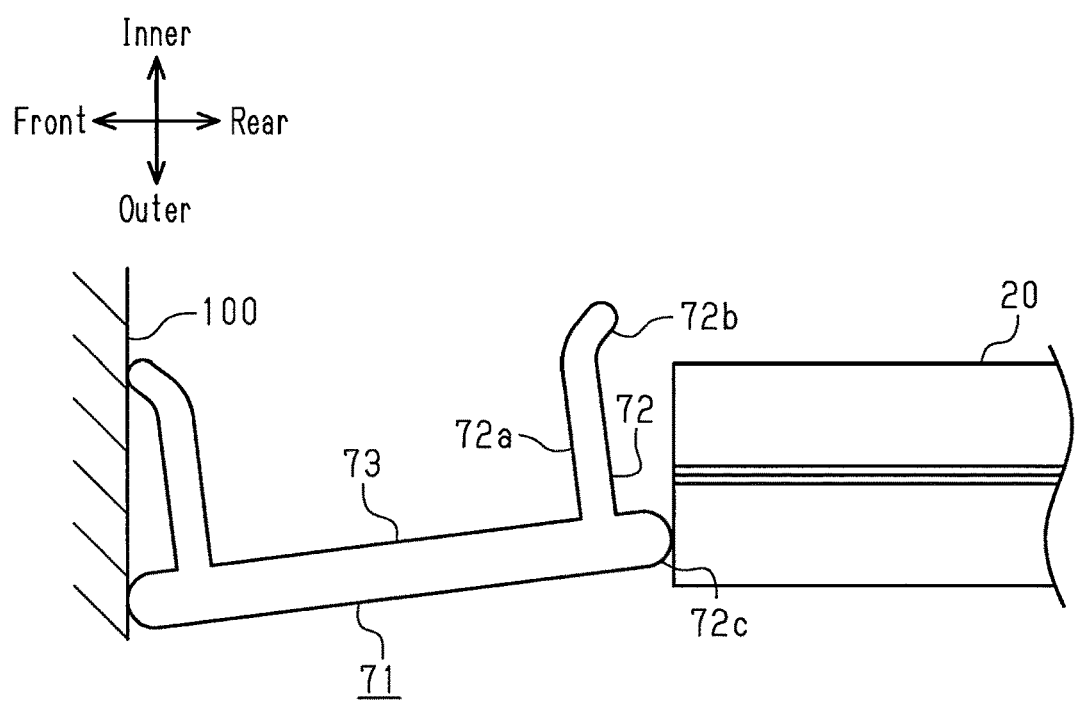
FIG. 7 is a diagram illustrating a state of a comparative example when a small overlap crash occurs at the portion corresponding to line A-A in FIG. 1.

As shown in FIG. 6, the front tire-wheel unit 70 includes a wheel 71. The wheel 71 includes a rim 72 and a disk 73. The rim 72 includes a tubular body 72a, a flange 72b (protrusion) formed on the inner side of the outer circumferential surface of the body 72a, and a flange 72c (protrusion) formed on the outer side of the outer circumferential surface of the body 72a. The disk 73 is arranged on the outer side of the inner surface of the tubular body 72a.

As shown in FIGS. 1 and 2, the front pillar 30 extends upward from the front end portion of the side sill 20. The front side member 40 extends frontward from the front pillar 30 on the inner side of the front pillar 30 and the side sill 20. The front side member 40 is coupled to under-reinforcements 41.

The suspension tower 50 is coupled to the front side member 40 at a portion of the front side member 40 located frontward from the front pillar 30. The front end of the cowl top side 60 is coupled to the suspension tower 50, and the rear end of the cowl top side 60 is coupled to the front pillar 30.

Figure 3:
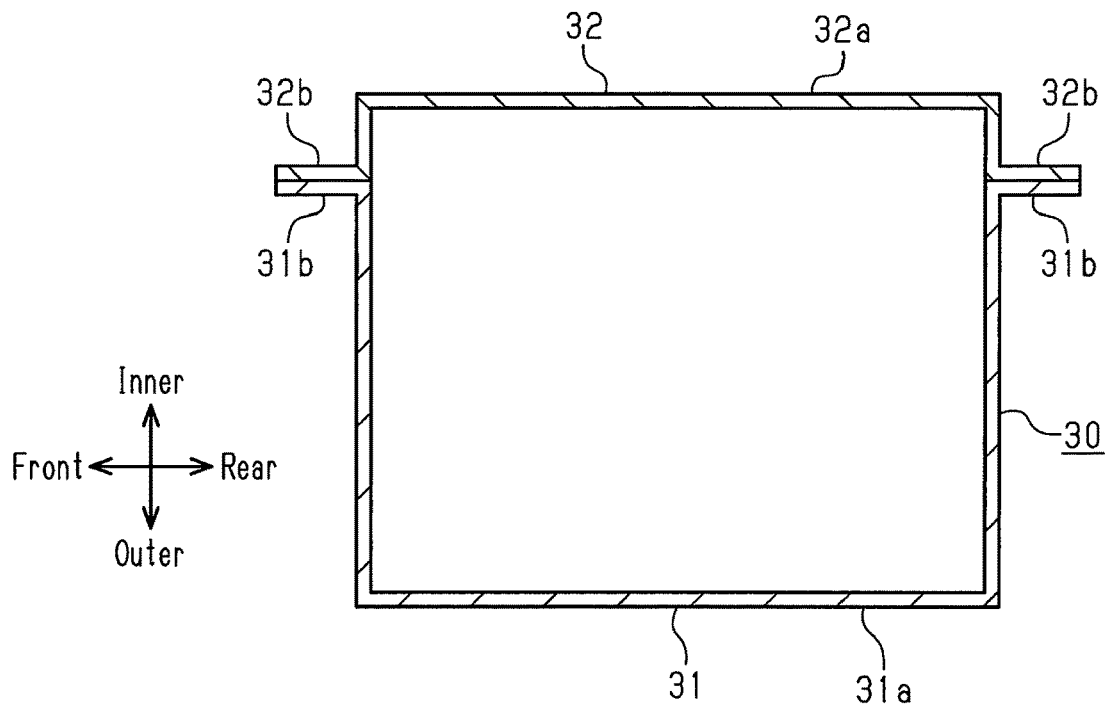
FIG. 3 is a cross-sectional view taken along line B-B in FIG. 1, showing a front pillar.

As shown in FIG. 3, the front pillar 30 has a closed cross-sectional structure. In detail, the front pillar 30 includes an outer panel 31 and an inner panel 32, each of which is made of a metal plate, so that the front pillar 30 has a box-shaped cross section. The outer panel 31 includes a body 31a having a channel-shaped cross section and a flange 31b extending from the ends of the body 31a. The inner panel 32 includes a body 32a having a channel-shaped cross section and a flange 32b extending from the ends of the body 31a. The flange 31b of the outer panel 31 and the flange 32b of the inner panel 32 are joined to each other with the flanges 31b and 32b overlapped with each other so as to close the openings of the bodies 31a and 32a, each of which has a channel-shaped cross section.

As shown in FIGS. 1 and 2, the front end of the side sill 20 is located at the rear of and spaced apart from the front tire-wheel unit 70, which is located on the front side. The side sill 20 extends rearward. As shown in FIGS. 5A to 5C, the side sill 20 has a closed cross-sectional structure configured by a side sill outer panel 21 and a side sill inner panel 22.

More specifically, the side sill 20 includes the side sill outer panel 21 and the side sill inner panel 22, each of which is made of a metal plate, so that the side sill 20 has a substantially box-shaped cross section.

The side sill outer panel 21 has a hat-shaped cross section. The side sill outer panel 21 includes a body 21a having a channel-shaped cross-section and a flange 21b extending from the ends of the body 21a. The side sill outer panel 21 extends in the front-to-rear direction. The side sill inner panel 22 has a hat-shaped cross section. The side sill inner panel 22 includes a body 22a having a channel-shaped cross-section and a flange 22b extending from the ends of the body 22a. The side sill inner panel 22 extends in the front-to-rear direction. The flange 21b of the side sill outer panel 21 and the flange 22b of the side sill inner panel 22 are joined to each other with the flanges 21b and 22b overlapped with each other so as to close the openings of the bodies 21a and 22a, each of which has a channel-shaped cross section. The space surrounded by the body 21a of the side sill outer panel 21 and the body 22a of the side sill inner panel 22 is a closed space.

The side sill 20 is provided with a side sill outer channel-shaped reinforcement 23, a side sill inner shoulder reinforcement 24, and a side sill outer shoulder reinforcement 25. The reinforcements 23, 24, and 25 reinforce the side sill 20 to prevent the side sill 20 from breaking even if the wheel 71 of the front tire-wheel unit 70 enters the side sill 20 when a small overlap crash occurs.

The side sill outer channel-shaped reinforcement 23 is made of a metal plate and has a channel-shaped cross section. The side sill outer channel-shaped reinforcement 23 extends in the front-to-rear direction. The side sill outer channel-shaped reinforcement 23 is joined to the side sill outer panel 21 in contact with the inner surface of the body 21a of the side sill outer panel 21 to reinforce the side sill outer panel 21 including the upper corner (ridge) and the lower corner (ridge) of the body 21a. On the front side, the side sill outer channel-shaped reinforcement 23 has the same length as the side sill outer panel 21 and the side sill inner panel 22. That is, the front end of the side sill outer channel-shaped reinforcement 23 is located at the substantially same position as the front ends of the side sill outer panel 21 and the side sill inner panel 22.

The side sill inner shoulder reinforcement 24 is made of a metal plate and bent in an inverted V-shaped cross section. The side sill inner shoulder reinforcement 24 extends in the front-to-rear direction. The side sill inner shoulder reinforcement 24 is joined to the side sill inner panel 22 in contact with the inner surface of the corner (ridge) of the body 22a of the side sill inner panel 22. On the front side, the side sill inner shoulder reinforcement 24 is shorter than the side sill outer panel 21 and the side sill inner panel 22. That is, the front end of the side sill inner shoulder reinforcement 24 is located rearward from the front ends of the side sill outer panel 21 and the side sill inner panel 22.

The side sill outer shoulder reinforcement 25 is made of a metal plate and bent in an inverted V-shaped cross section. The side sill outer shoulder reinforcement 25 extends in the front-to-rear direction. The side sill outer shoulder reinforcement 25 is joined to the side sill outer channel-shaped reinforcement 23 in contact with the inner surface of the side sill outer channel-shaped reinforcement 23 at a portion corresponding to the upper corner (ridge) of the body 21a of the side sill outer panel 21.

As shown in FIG. 6, when a small overlap crash occurs, a flange 72c of the rim 72 located on the outer side of the wheel 71 of the front tire-wheel unit 70 strikes the outer side of the side sill 20. In particular, the outer side of the wheel 71 of the front tire-wheel unit 70 strikes the upper corner (upper ridge) of the side sill 20. Thus, the arrangement of the side sill outer channel-shaped reinforcement 23 and the side sill outer shoulder reinforcement 25 in the side sill 20 reinforces the upper corner of (upper ridge) of the side sill 20.

Further, the front end portion of the side sill outer shoulder reinforcement 25, which serves as an outer reinforcement, is located rearward from the front end portions of the side sill outer panel 21 and the side sill inner panel 22. The strengths of the parts of the side sill are differentiated by whether or not the side sill outer shoulder reinforcement 25 is included. This defines a non-crush area Z1 and a crush area Z2 in the side sill 20 when the wheel 71 of the front tire-wheel unit 70 enters the side sill 20. The crush area Z2 is an area of the side sill 20 that is to be intentionally crushed. That is, the rear part of the side sill 20 where the side sill outer shoulder reinforcement 25 is arranged is the non-crush area Z1, which is not crushed by the load applied when a small overlap crash occurs. The front end portion of the side sill 20 where the side sill outer shoulder reinforcement 25 is not arranged is the crush area Z2. When the wheel 71 of the front tire-wheel unit 70 enters the side sill 20, the area Z2 is crushed to reduce the load that deforms the side sill 20 inward. The non-crush area Z1 of the side sill 20 forces the wheel 71 of the front tire-wheel unit 70 outward.

Figure 4:
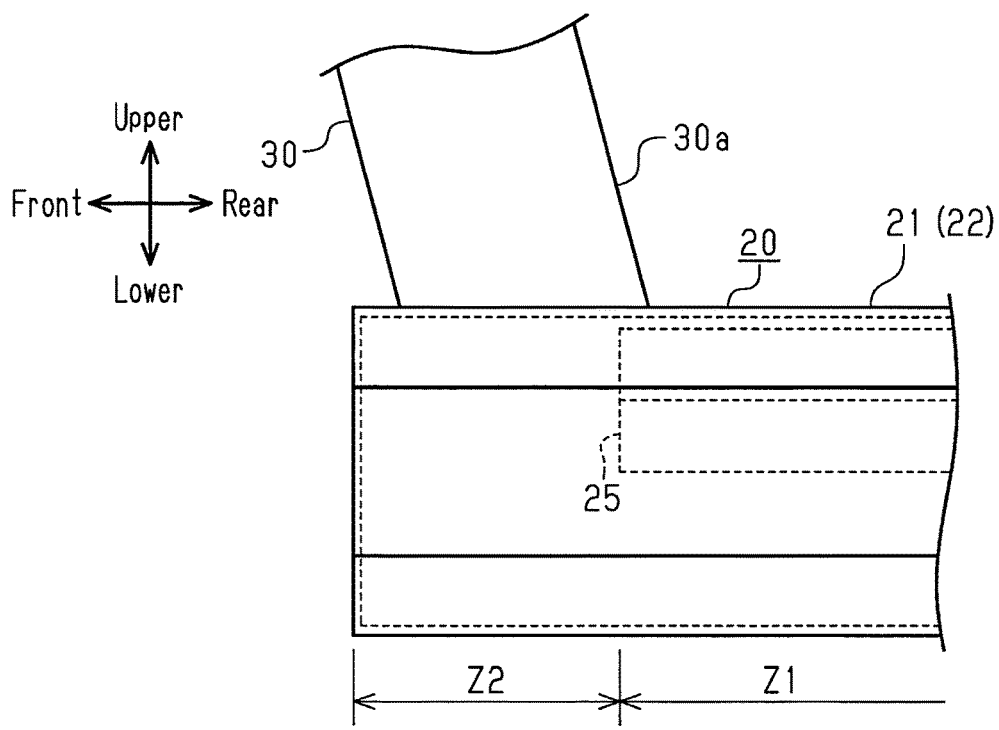
FIG. 4 is a side view showing a front end portion of a side sill in the front framework of the vehicle of FIG. 1.

As shown in FIG. 4, the front pillar 30 includes a rear wall 30a connected to the side sill 20. In the side sill 20, the front end portion of the side sill outer shoulder reinforcement 25 is located frontward from the position where the rear wall 30a of the front pillar 30 is connected to the side sill 20. In this manner, the crush area Z2 of the side sill 20, which does not include the side sill outer shoulder reinforcement 25 of the side sill 20, is elongated as much as possible in order to increase the amount of energy absorption (EA amount).

The operation of the present embodiment will now be described.

As shown in FIG. 5A, the side sill 20 has the closed cross-sectional structure, in which the side sill outer panel 21 and the side sill inner panel 22 are combined with each other. Thus, the rigidity of the side sill 20 is kept during a normal time, i.e., when a small overlap crash does not occur.

As shown in FIG. 1, when a small overlap crash occurs, load is transmitted from a small overlap barrier 100 in the following three paths.

In a first load transmission path, load is transmitted from the small overlap barrier 100 through the wheel 71 (refer to FIGS. 6 and 7) of the front tire-wheel unit 70 to the side sill 20. In a second load transmission path, load is transmitted from the small overlap barrier 100 through the front side member 40 to the under-reinforcements 41. In a third load transmission path, load is transmitted from the small overlap barrier 100 through the front side member 40, the suspension tower 50, and the cowl top side 60 to the front pillar 30.

When load is transmitted from the small overlap barrier 100 through the wheel 71 of the front tire-wheel unit 70 to the side sill 20 in the first load transmission path, the load is applied to the side sill 20 to bend the side sill 20. This increases the amount of inward deformation of the vehicle, for example, the amount of backward movement of the front pillar 30.

In the present embodiment, as shown in FIG. 6, when a small overlap crash occurs, the outer side of the wheel 71 of the front tire-wheel unit 70 contacts the outer side of the side sill 20 to partially crush the area Z2 of the front end portion of the side sill 20. This allows for optimal absorption of the load applied from the wheel 71 of the front tire-wheel unit 70. Further, the non-crush area Z1 of the side sill 20 causes the wheel 71 of the front tire-wheel unit 70 to be forced outward. This restricts the wheel 71 from entering the passenger compartment. In addition, the entry of the front pillar 30 into the passenger compartment can be restricted without crushing or breaking the front pillar 30.

Additionally, the non-crush area Z1, which is the rear part of the side sill 20, is reinforced so that the non-crush area Z1 is not crushed by the load applied when a small overlap crash occurs. Further, the area Z2, which is the front end portion of the side sill 20, is configured to be crushed by the load applied when a small overlap crash occurs. This reduces the load applied to the side sill 20 in the non-crush area Z1, which will be described with reference to FIGS. 6 and 7. As shown in a comparative example in FIG. 7, when the outer side of the side sill does not include a crush part, the load applied to the side sill is large. In the embodiment shown in FIG. 6, the crush area Z2 reduces the load applied to the side sill 20.

In the embodiment shown in FIG. 6, the crush area Z2 absorbs impact to reduce the load applied to the side sill 20. This reduces the load that is to be withstood by the side sill 20 and thus reduces the thickness of the side sill 20. Accordingly, the side sill 20 is reduced in mass. That is, the thickness of the side sill 20 is reduced to decrease the side sill 20 in weight, minimizing the inward deformation of the side sill 20 within an allowable range. In such a situation, the side sill 20 can force the wheel 71 of the front tire-wheel unit 70 outward from the region between the small overlap barrier 100 and the side sill 20.

The above-described embodiment has the following advantages.

(1) In the side sill structure, the front end of the side sill 20 is located at the rear of and spaced apart from the front tire-wheel unit 70, which is located on the front side. The side sill 20 extends rearward. The side sill 20 has the closed cross-sectional structure, which includes the side sill outer panel 21 and the side sill inner panel 22. The side sill structure includes the side sill outer shoulder reinforcement 25, which serves as the outer reinforcement. Further, the front end portion of the side sill outer shoulder reinforcement 25 is located rearward from the front end portions of both the side sill outer panel 21 and the side sill inner panel 22. Thus, when the outer side of the wheel 71 of the front tire-wheel unit 70 strikes the outer side of the side sill 20 during a small overlap crash, the portion that does not include the side sill outer shoulder reinforcement 25 acts as the crush area Z2 to optimally absorb the load applied from the outer side of the wheel 71. In such a manner, since the front end portion of the side sill outer shoulder reinforcement 25 is located rearward from the front end portions of both the side sill outer panel 21 and the side sill inner panel 22, the portion of the side sill 20 that does not include the side sill outer shoulder reinforcement 25 acts as the crush area Z2.

(2) The front end portion of the side sill outer shoulder reinforcement 25, which serves as the outer reinforcement, is located frontward from the position where the rear wall 30a of the front pillar 30 is connected to the side sill 20. This further lengthens the front end portion of the side sill 20, which does not include the side sill outer shoulder reinforcement 25, while keeping the strength of the front pillar 30 and the side sill 20. This maximizes the amount of energy absorbed by the side sill 20.

It should be apparent to those skilled in the art that the present disclosure may be embodied in many other specific forms without departing from the spirit or scope of the disclosure. Particularly, it should be understood that the present disclosure may be embodied in the following forms.

The front end portion of the side sill outer channel-shaped reinforcement 23 and the front end portion of the side sill outer shoulder reinforcement 25 may be located rearward from the front end portions of both the side sill outer panel 21 and the side sill inner panel 22. That is, both the side sill outer channel-shaped reinforcement 23 and the side sill outer shoulder reinforcement 25 may serve as outer reinforcements so that the front end portions of both the side sill outer channel-shaped reinforcement 23 and the side sill outer shoulder reinforcement 25 are located rearward from the front end portions of both the side sill outer panel 21 and the side sill inner panel 22.

In the above-described embodiment, the side sill 20 is provided with the side sill outer channel-shaped reinforcement 23 and the side sill outer shoulder reinforcement 25. Instead, the side sill 20 may be provided with only one of the side sill outer channel-shaped reinforcement 23 and the side sill outer shoulder reinforcement 25 (i.e., only the side sill outer channel-shaped reinforcement 23 or the side sill outer shoulder reinforcement 25).

In this case, the side sill outer channel-shaped reinforcement 23 does not have to be arranged, and the front end portion of the side sill outer shoulder reinforcement 25 may be located rearward from the front end portions of both the side sill outer panel 21 and the side sill inner panel 22.

Alternatively, the side sill outer shoulder reinforcement 25 does not have to be arranged, and the front end portion of the side sill outer channel-shaped reinforcement 23 may be located rearward from the front end portions of both the side sill outer panel 21 and the side sill inner panel 22. That is, the side sill outer channel-shaped reinforcement 23 may serve as an outer reinforcement so that the front end portion of the side sill outer channel-shaped reinforcement 23 is located rearward from the front end portions of both the side sill outer panel 21 and the side sill inner panel 22.

In the above-described embodiment, the side sill outer shoulder reinforcement 25 is used to reinforce the upper corner (upper ridge) of the side sill 20 when a small overlap crash occurs. Instead, the side sill outer shoulder reinforcement may be used to reinforce the lower corner (lower ridge) of the side sill 20 when a small overlap crash occurs. For example, the front end portion of the side sill outer shoulder reinforcement arranged on the lower corner (lower ridge) may be located rearward from the front end portions of both the side sill outer panel 21 and the side sill inner panel 22.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A side sill structure, comprising a side sill, the side sill including:
   a front pillar;
   a side sill outer panel;
   a side sill inner panel, the side sill outer panel and the side sill inner panel forming a closed cross-sectional structure; and
   an outer reinforcement, wherein
   a front end of the side sill is located at a rear of and spaced apart from a front tire-wheel unit on a front side of a vehicle;
   the side sill extends rearward;
   a front end portion of the outer reinforcement is located rearward from front end portions of both the side sill outer panel and the side sill inner panel;
   the front pillar includes a front wall connected to the side sill and a rear wall connected to the side sill;
   the outer reinforcement extends in a front-to-rear direction of the vehicle;
   the outer reinforcement is joined to the side sill outer panel inside the closed cross-sectional structure;
   the front end portion of the reinforcement is located rearward from a position where the front wall of the front pillar is connected to the side sill, and is located frontward from a position where the rear wall of the front pillar is connected to the side sill; and
   the front end portions of the side sill outer panel and the side sill inner panel are located frontward from the front wall of the front pillar.

2. A method for manufacturing a side sill structure including a side sill, the method comprising:
   forming a closed cross-sectional structure with a side sill outer panel and a side sill inner panel;
   arranging a front end of the side sill at a rear of a front tire-wheel unit on a front side of a vehicle and spacing the front end of the side sill apart from the front tire-wheel unit;
   extending the side sill rearward;
   reinforcing the side sill with an outer reinforcement;
   arranging a front end portion of the outer reinforcement rearward from front end portions of both the side sill outer panel and the side sill inner panel;
   connecting a front wall and a rear wall of a front pillar to the side sill;
   extending the outer reinforcement in a front-to-rear direction of the vehicle,
   joining the outer reinforcement to the side sill outer panel inside the closed cross-sectional structure;
   locating the front end portion of the outer reinforcement rearward from a position where the front wall of the front pillar is connected to the side sill;
   locating the front end portion of the outer reinforcement frontward from a position where the rear wall of the front pillar is connected to the side sill;
   locating the front end portions of the side sill outer panel and the side sill inner panel frontward from the front wall of the front pillar.

* * * * *